Aug. 25, 1953    F. W. MEREDITH ET AL    2,650,338
AUTOMATIC AIRCRAFT CONTROL SYSTEM
Filed Feb. 11, 1949
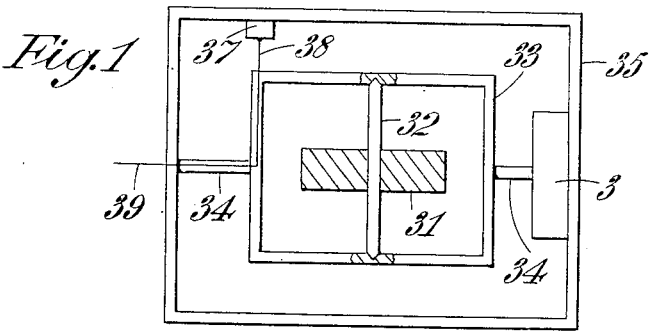
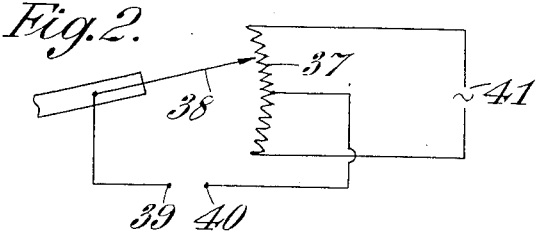
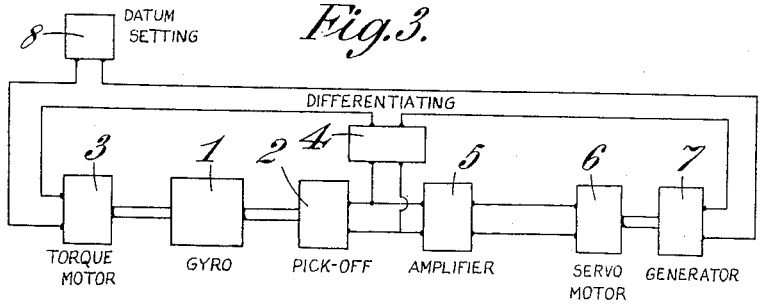
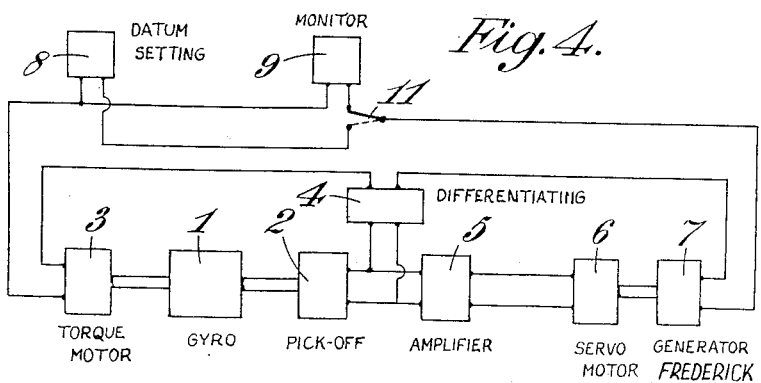
INVENTORS
FREDERICK WILLIAM MEREDITH
JAMES SUDWORTH
DONALD LELLO MEREDITH &
DAVID WILLIAM RIGHTON
BY Moore & Hall
ATTORNEYS Patented Aug. 25, 1953

2,650,338

UNITED STATES PATENT OFFICE 2,650,338

AUTOMATIC AIRCRAFT CONTROL SYSTEM

Frederick William Meredith, James Sudworth, Dennis Lello Meredith, and David William Righton, Cricklewood, London, England, assignors to S. Smith & Sons (England) Limited, Cricklewood, London, England, a British company Application February 11, 1949, Serial No. 75,802
In Great Britain February 16, 1948

12 Claims. (Cl. 318—489)

The present invention relates to automatic control systems, and is particularly adapted for use in automatic control systems for maintaining certain of the quantities determining the path of a craft constant. Such quantities may for example be the rates of turn of an aircraft in azimuth roll or pitch. In automatic control systems of this kind it has been proposed to provide devices detecting the rates of turn of the craft about various axes and use the outputs from these devices to control, through amplifiers and servo-motors the control surfaces by actuation of which the said rates of turn may be varied. Such a system is for instance described in British specification No. 611,037. In such systems difficulties have arisen owing to the fact that the zeros of the rate of turn detectors have tended to shift during service, owing to mechanical disturbance of the pick-off device (so that zero output signal may not indicate zero rate of turn) and also owing to the fact that the amplifier zeros may also shift (so that zero output does not necessarily correspond to zero input). By the term "amplifier" we mean a device by means of which a low power input is enabled to give rise to an output at a higher power level. It thus includes for example in addition to such devices as thermionic valve power amplifiers such devices as electro-magnetic and pneumatic relays. Difficulties may also arise in an electrically operated automatic control system, from stray pick-up in the lines carrying the various control voltages, giving effects similar to those of zero shifts. It is the object of the present invention to provide automatic control systems in which errors arising from causes such as those considered above are substantially eliminated.

According to the present invention an automatic control system for varying a condition in accordance with the rate of change of a variable quantity comprises a member displaceable by a first force which is in accordance with said rate of change, a pick-off device giving a signal in accordance with the displacement of said member from a datum position, an amplifier, to the input of which is applied said signal, controlling means for said condition actuated by the output from said amplifier, a signal generator generating a signal in accordance with rate of change of the condition and means for applying to the said displacement member a second force in accordance with the output signal from said signal generator in opposition to the first force. Preferably in such a system the magnitude of said second force is in accordance with the sum of the output signal from the signal generator and a pseudo-differential with respect to time of the signal from the said pick-off means. The said pseudo-differential input tends to oppose any tendency of the system to oscillate.

By a pseudo-differential with respect to time of a given quantity is meant the quantity obtained by application of an operator of the form $$\frac{\tau D}{1+\tau D}$$

to the given quantity, where $\tau$ is a constant and D represents the operator of differentiation with respect to time. If a voltage proportional to the given quantity is applied to a condenser C and resistance R in series the voltage developed across the resistance is well known to be obtained by applying the operator $$\frac{CRD}{1+CRD}$$

to the total voltage i. e. the voltage across the resistance is proportional to a pseudo-differential of the given quantity. Similarly if an A. C. signal is available whose amplitude is proportional to the quantity, an A. C. signal proportional to a pseudo-differential of the quantity is readily obtainable by the combination of demodulating, condenser-resistance and remodulating circuits in a manner which will be immediately obvious to those skilled in the art.

The controlling means is preferably a motor actuated by the output from the amplifier and operating to vary the condition.

Such a system may conveniently be used to maintain the rate of change of the variable quantity at a given value. In such a case the motor actuates means to vary the rate of change of the variable, and the condition referred to is the rate of displacement of the means adapted to vary the rate of change of the variable.

Preferably in such a system a further input to the force-producing means is provided by datum-setting means, whereby the system operates to reduce the resultant force on the displaceable member to zero and so maintain the rate of change of the variable at a value determined by the said datum-setting means.

The present invention also consists in an automatic control system for stabilising a craft in a datum attitude about an axis therein comprising a member displaceable by a force in accordance with the rate of change in the attitude of the craft about said axis, force producing means adapted to produce an opposing force on said member in accordance with the input signal to said force producing means, pick-off means giving a signal in accordance with the displacement of said member from a datum position, an amplifier to the input of which is applied the output from said pick-off means, a motor actuated by the output from said amplifier and operating to restore the aircraft to the datum attitude about said axis and a signal generator generating a signal in accordance with the speed of said motor, the input to the force-producing means being provided by the output from said generating means.

It is to be understood that the term "force" used above is used in the sense of a generalised force, that is, it is that which on a suitable change in the configuration of a system does work, and so includes for example a torque.

Embodiments of the invention, in which it is applied to the automatic control of a craft, such as an aircraft, will now be described. These could be used for example in the automatic control system for aircraft described in British Specification No. 611,037. For convenience the control of the rudder will be described with reference to the drawings, although it will be understood that the invention can be equally readily applied to the control of the ailerons and elevators.

In the drawings:

Figure 1 shows a gyroscope, pick-off, and torque motor which constitutes the displaceable member, pick-off and force-generating means according to the invention.

Figure 2 shows diagrammatically the pick-off in more detail.

Figure 3 is a block diagram showing an automatic control system for maintaining the rate of turn of a craft at a pre-determined value.

Figure 4 is a block diagram showing an automatic control system for maintaining a craft on a pre-determined course.

The gyroscope and its associated components shown in Figure 1 will first be described. The gyroscope rotor 31 rotates at a uniform angular velocity on its axis 32 journalled in a frame 33. The frame 33 is free to rotate about axis 34 (at right angles to the gyroscope rotor axis 32) journalled in a frame 35, being only restrained by a torque motor 3. When the aircraft is on a straight and level course the plane of axes 32 and 34 is horizontal. A voltage proportional to the rotation of the plane of axes 32 and 34 about axis 34 from the plane of frame 35 (which is normally horizontal) is obtained from the pick-off shown diagrammatically in detail in Figure 2. A conducting wiper arm 38 mounted on the frame 33 is connected to terminal 39 and sweeps over the arcuate resistance 37. The ends of resistance 37 are connected to a source of alternating current 41 and its centre-tap is connected to terminal 40. The voltage between terminals 39 and 40 then depends in magnitude and phase, upon the amount and direction of the rotation of the frame 33 about the axis 34. If the axis 34 is considered to be fixed in frame 35, it is well known that on rotation of frame 35 about an axis normal to itself a torque will be generated about axis 34 proportional to the rate of such rotation.

The automatic control system shown in Figure 3 will now be described. The signals referred to throughout the description of the systems shown in the drawings will be A. C. signals all of the same substantially constant frequency and all in substantially the same phase. The gyroscope 1 and pick-off 2 have already been described. The torque motor 3 generates a torque about the axis 34 in accordance with the magnitude and phase of its A. C. input. A datum setting circuit 8 (which may conveniently be constituted by a potentiometer supplied with an A. C. voltage of constant amplitude e. g. the tangent potentiometer 24 of Figure 1 of British specification No. 611,037) supplies an output proportional to the desired rate of turn of the craft. The outputs from a differentiating circuit 4, a generator 7 and the datum-setting circuit 8 are connected in series and applied to the input of the torque motor 3. The output from the pick-off 2 is fed to the input of an amplifier 5 and the differentiating circuit 4. If the amplitude of the input to this latter circuit is V (varying with time) the amplitude of its output is of the form $$\frac{A\tau D}{1+\tau D}V$$

where A and $\tau$ are constants while D is the operator of differentiation with respect to time.

The output of the amplifier 5 is fed to the servomotor 6 which operates the rudder of the aircraft and also drives the generator 7 which may be of any convenient tachometric type. This produces an A. C. output of an amplitude proportional to the speed of rotation of the servomotor and of phase depending upon the direction of such rotation.

The method of operation of the system will now be described. The device 8 is adjusted to give a signal corresponding to the rate of turn which it is desired to impart. If the craft is in actual fact turning at this rate, and the pick-off is in its zero position (i. e. arm 38 on the centre tap of resistance 37) no signal will be supplied to the amplifier to move the rudder. The precessional torque of gyroscope will then be equal and opposite to that of the torque motor 3. If the rate of turn is not equal to that which is desired, the torques will not be equal and the gyro will move, its direction of movement depending upon the sign of the difference between the desired and actual rates of turn. The resultant signal from the pick-off, fed to the amplifier, will actuate the servomotor causing both actuation of the rudder and rotation of the generator 7. The output from generator 7 fed to the torque motor 3 will oppose the effect of the resultant of the torque due to the signal from the device 8 and the gyroscopic torque due to the rate of turn of the aircraft, and a state will rapidly be reached in which the net torque acting on the gimbal ring is zero. The rate of rotation of motor 6 and the rudder will then be proportional to the discrepancy between the rate of turn demanded by the signal from device 8. The displacement of the rudder consequent upon the rotation of motor 6 will alter the rate of turn of the aircraft to correct the discrepancy. As the discrepancy is reduced, the rate of turn of motor 6 and the rudder will be reduced, until eventually the rudder is stationary and the actual rate of turn of the craft is equal to that demanded by the signal from device 8. That is to say the rudder will be actuated until a state is reached in which the precessional torque is equal to the torque of motor 3 and the gyro is in equilibrium about axis 34. The rate of turn of the craft is then that determined by the datum setting circuit.

A modification of the above described system is shown in Figure 4, which shows a system for maintaining the aircraft on a pre-determined course. The components are as in the system shown in Figure 3, except for the addition of a monitor 9 and single-pole double throw switch 11. The monitor 9 supplies a signal in accordance with the deviation of the craft from its desired course and may conveniently comprise a pick-off device generally similar to that shown in Figure 2, except that the wiper-arm is driven from a suitable compass repeater in such a way that when the craft is on course the wiper-arm rests on the centre-tap of the resistor. An example of a monitor for this purpose is described in co-pending application No. 43,336.

When it is desired to maintain the heading of the craft constant switch 11 is in the position shown in full line in which case the datum setting device 8 is out of circuit and the monitor 9 is in circuit. The system will then operate the rudder until the net torque on the gyroscope is zero, which implies that the rate of turn of the craft is zero and that the craft is on its desired course. By analogy with the explanation of the working of the arrangement of Figure 3 it will be seen that, so long as the craft is not on course, the rate of turn towards course will be proportional to deviation from course. If it is desired to change course switch 11 is put into the position shown dotted, and the system then operates to turn the aircraft at a rate determined by the setting of the datum-setting means 8. Conveniently a clutch is provided as described in copending application No. 43,336 to break the drive between the compass monitor and its associated pick-off when the craft is turning and re-engage the drive when the turn is completed. The system will then maintain the aircraft on the course reached at the completion of the turn.

The effect of device 4 has not so far been discussed. This provides damping of the motion of gimbal ring 33, by causing a torque to be generated by torque motor 3 upon motion of the gimbal ring 33, the torque decaying to zero when the gimbal ring is stationary. Thus when a sudden torque is applied to gimbal ring 33 because of, for example, either a sudden turn of the aircraft on a sudden turn demand signal from device 8, a restraining torque is brought into play by device 4. Excessively violent movement of gimbal ring 33 is thus prevented by device 4, though it has no effect on the long term functioning of the system as described earlier.

It will be seen that any zero shift of the amplifier or stray pick-up in the leads will not affect the accuracy of the system, as it will always operate to reduce the resultant torque on the gyroscope to zero in spite of these. Any such zero shift or stray signal is cancelled out by an appropriate displacement of the pick-off device 2. Such displacement with zero torque applied to the gimbal ring is posible by reasons of their being no spring restraint on the gimbal ring. The difficulties arising by reason of the use of a spring restrained gyro and pick-off for measurement of rate of turn, due to displacement of the pick-off or spring zero, are also eliminated.

For a complete understanding of the present invention it should be clear that a gyroscope such as 31 which is under no resilient restraint need not take up a definite position relative to any selected set of axes if the gyroscope is moved in a straight line. Of two identical systems each having a gyro 31, the one gyro may be level in space and the other at an angle.

If these gyros are mounted in the same or different planes they will maintain their arbitrary positions or direction, both in the plane and in space, so long as the craft are moving along any straight course. Similarly if the craft or crafts continue to move in a straight line the position of one or both gyros can be shifted (e. g. by hand with datum setting device 8 or the like) from the level position to the tilted position, or vice versa, and the new position or positions will be maintained as long as the craft continues to move in a straight line.

It must be appreciated that the gyroscope 31 of the present invention is not provided with erecting devices to bring it into a fixed orientation with the earth's gravitational field, such as are provided with conventional artificial horizon or directional gyroscopic instruments.

Referring to Fig. 1, upon the occurrence of a rate of turn of the aircraft (i. e. an angular velocity $\omega$ clockwise about the axis OZ vertical to the paper), the direction of spin of wheel 31 being clockwise about axis 32 looking from bottom to top, the gyroscope frame 33 will tend to move about axis 34 and in order to maintain the frame 33 in its original plane it would be necessary to apply a torque $Cn\omega$ about the axis 34 in the opposite direction ($n$ being the angular velocity of spin of gyro 31 and C the moment of inertia about the spin axis, the product $Cn$ being the angular momentum about the spin axis 32).

This is fully dealth with in texts and standard work on dynamics. For example see "Higher Mechanics" by Lamb (Cambridge University Press, 1929) article 54 on pages 130, 131, and "Textbook of Mechanics" by Wood (John Wiley & Sons, 1926) chap. 25, pages 224–243. If the gyroscope 31 were a spring restrained rate gyro, it would precess about axis 34 until the opposing spring torque equalled $Cn\omega$.

In the present construction as there is no restraining spring gyro 31 will precess until the torque produced by the torque motor 3 is equal to $Cn\omega$, that is to say, until the signal from potentiometer 37 produces through amplifier 5 and servomotor 6 actuation of the rudder at such a rate that the signal from generator 7 applied to torque motor 7 produces a torque $Cn\omega$, or the rudder is rotated at a rate proportional to the rate of turn $\omega$ (neglecting for the moment the signal from datum setting device 8 and from differentiating device 4). This will result in the reduction of the rate of turn $\omega$ to zero. The signal from device 4 will be zero except during motion of ring 33 and slider 38, and when such motion is taking place the result will be merely the production of a torque proportional to the rate of movement to oppose the movement, which torque will, as is well known, tend to damp out oscillations of ring 33. Thus this has no effect upon steady state conditions but merely ensures that they are reached rapidly. The signal from datum setting device 8 will be zero unless a change of course is demanded. When a signal from 8 which is not zero is applied, the result will be a rotation of ring 33 by torque motor 3. This will result in the production of a signal from the pick-off, giving rotation of motor 6 and generator 7, and the consequent rotation of the rudder will produce a rate of turn of the aircraft, at a rate say, in the direction demanded, and the rate of turn of the aircraft will cause the gyroscope to generate a torque ($n\omega$) in the opposite direction to that produced by torque motor 3 in response to the signal from 8. It is clear that a state will rapidly be reached in which $Cn\omega$ and the torque motor torque are equal and opposite and the frame 33 is stationary, i. e. the aircraft is turning at the rate demanded by the signal from 8. Similarly when the turn has been completed and the signal from 8 is reduced to zero the rudder will be actuated until the rate of turn of the aircraft is reduced to zero also.

An important part of the invention is the cancelling of system error by movement of frame 33 and displacement of wiper 38 from the center tap of resistor 37 to maintain the plane in straight level flight on course.

The aircraft can be in straight and level flight with the slider 38 stationary and displaced from the centre tap of resistor 37, the displacement from the centre tap serving to cancel out zero errors in other parts of the system. As explained earlier, the gyroscope will maintain the direction of its axis fixed in space in any position to which it may be brought, not necessarily level, so long as the aircraft is flying in a straight line and torque motor 3 is generating no output. Now consider the situation if slider 38 is stationary on centre tap 37, the aircraft is flying straight and level, and a zero error suddenly appears in the system—for example, amplifier 5 gives an output although the input is zero. Servomotor 6 will rotate, producing movement of the rudder which in its turn will produce a rate of turn of the aircraft and precession of the gyroscope and rotation of generator 7 and a consequent torque on the gyroscope via torque motor 3. It will be seen that the system must settle down with the ring 33 stationary. This will mean that the torque of motor 3 must be zero—otherwise generator 7 would be rotating, the rudder would be being moved and there would be a consequently varying rate of turn of the craft—and so the precessional torque upon the gyroscope must be zero, and the rate of turn of the aircraft must likewise be zero. As generator 7 is stationary, the zero error in amplifier 11 must be cancelled out by a signal from the gyroscope. This implies that the slider 38 is displaced from the centre tap, and that the frame 33 is not level in the aircraft.

This is true even though the plane is in level flight along a straight line and will continue as long as amplifier 5 produces an error signal which needs to be balanced out. In addition intermittent saturation of the amplifier will not affect the system when an appreciable interval of time (which is nevertheless small compared with the long period motion of the aircraft) is considered.

We claim:

1. In combination an automatic control system for varying a condition in accordance with the rate of change of a variable quantity comprising a member displaceable by a first force which is in accordance with said rate of change, a pick-off device giving a signal in accordance with the displacement of said member from a datum position, an amplifier, to the input of which is applied said signal, controlling means for said condition actuated by the output from said amplifier, a signal generator generating a signal in accordance with the condition and means for applying to said displaceable member a second force in accordance with the output signal from said signal generator in opposition to the first force whereby zero error within the system is cancelled by appropriate displacement of said member.

2. An automatic control system for varying a condition in accordance with the rate of change of a variable quantity comprising a member displaceable by a first force which is in accordance with said rate of change, a pick-off device giving a signal in accordance with the displacement of said member from a datum position, an amplifier, to the input of which is applied said signal, controlling means for said condition actuated by the output from said amplifier, a signal generator generating a signal in accordance with the condition and means for applying to said displaceable member in opposition to the first force a second force in accordance with the sum of the output signal from the signal generator and a pseudo-differential with respect to time of the signal from the pick-off device.

3. An automatic control system for varying a condition in accordance with the rate of change of a variable quantity comprising a member displaceable by a first force which is in accordance with said rate of change, a pick-off device giving a signal in accordance with the displacement of said member from a datum position, an amplifier, to the input of which is applied said signal, a motor actuated by the output from the amplifier and operating to vary the condition, a signal generator generating a signal in accordance with the speed of said motor and means for applying to said displaceable member a second force in accordance with the output signal for said signal generator in opposition to said first force.

4. An automatic control system for maintaining a variable quantity at a datum value comprising a member displaceable by a first force in accordance with the rate of change of said quantity, a pick-off device giving a signal in accordance with the displacement of said member from a datum position, an ampliler, to the input of which is applied said signal, a motor actuated by the output from said amplifier and operating to vary the quantity to restore it to the datum value, a signal generator generating a signal in accordance with the speed of said motor and means for applying to said displaceable member a second force in accordance with the output signal from said signal generator in opposition to said first force.

5. An automatic control system for maintaining a variable quantity at a datum value comprising a member displaceable by a first force in accordance with the rate of change of said quantity, a pick-off device giving a signal in accordance with the displacement of said member from a datum position, an amplifier, to the input of which is applied said signal, a motor actuated by the output from said amplifier and operating to vary the quantity to restore it to the datum value, a signal generator generating a signal in accordance with the speed of said motor and means for applying to said displaceable member in opposition to said first force a second force in accordance with the sum of the output signal from said signal generator and a variable signal for varying the rate of change of the variable quantity, whereby the system operates to reduce the resultant force on the displaceable member to zero and so maintain the rate of change of the variable quantity at a value determined by the magnitude of said variable signal.

6. An automatic control system for stabilising a craft in a datum attitude about an axis therein comprising a member displaceable by a force in accordance with the rate of change in the attitude of the craft about said axis, force producing means adapted to produce an opposing force on said member in accordance with the input signal to said force producing means, pick-off means giving a signal in accordance with the displacement of said member from a datum position, an amplifier to the input of which is applied the output from said pick-off means, a motor actuated by the output from said amplifier and operating to restore the craft to the datum attitude about said axis and a signal generator generating a signal in accordance with speed of said motor, the input to the force-producing means being provided by the output from said generating means.

7. An automatic control system as claimed in claim 6 in which a further signal in accordance with a pseudo-differential with respect to time of the signal from the pick-off means is applied to the input of the force-producing means.

8. An automatic control system as claimed in claim 7 comprising also means for generating a signal having a magnitude in accordance with the desired rate-of-turn of the craft about said axis and means for applying the rate-of-turn determining signal to the input of the said force-producing means whereby the system operates to reduce the resultant force on said member to zero and so maintain the rate of turn of the craft at a value determined by the rate-of-turn determining signal.

9. An automatic control system as claimed in claim 8 comprising also a monitor generating a signal in accordance with the deviation of the craft about said axis from the datum attitude, which monitoring signal is applied to the input of the force-producing means whereby the system operates to reduce the resultant force on the member to zero and so maintain the craft at the datum attitude, said monitor being operable only when said datum setting means is not operative to produce a rate of turn.

10. An automatic control system for stabilising a craft in a datum attitude about an axis therein comprising a gyroscope having a single precessional degree of freedom, the said axis of the craft being substantially normal to the plane of the spin and precessional axes of said gyroscope, a displaceable member fixed with respect to the spin axis of said gyroscope, a torque motor arranged to apply a torque to said gyroscope about the precessional axis thereof, pick-off means giving a signal in accordance with the displacement of said member from a datum position, an amplifier to the input of which is applied the output from said pick-off means, a motor actuated by the output from said amplifier and operating to restore the craft to the datum attitude about said axis, a signal generator generating a signal in accordance with the speed of said motor, and means for applying the signal from said signal generator to the input of said torque motor.

11. An automatic control system for stabilising a craft in a datum attitude about an axis therein comprising a gyroscope having a single precessional degree of freedom, the said axis of the craft being substantially normal to the plane of the spin and precessional axes of said gyroscope, a displaceable member fixed with respect to the spin axis of said gyroscope, and electric torque motor arranged to apply a torque to said gyroscope about the precessional axis thereof, pick-off means giving an electric signal in accordance with the displacement of said member from a datum position, an amplifier to the input of which is applied from said pick-off means, an electric motor actuated by the output from said amplifier and operating to restore the craft to the datum attitude about said axis, a signal generator generating an electric signal in accordance with the speed of said motor, means for generating an electric signal in accordance with the differential with respect to time of the signal from the pick-off means, means for generating an electric signal in accordance with the desired rate of turn of the craft about said axis and means for applying the algebraic sum of the rate-of-turn determining signal, the signal from said signal generator and the signal in accordance with the differential with respect to time of the pick-off signal to the input of said torque motor, whereby the system operates to reduce the resultant force on said member to zero and so maintain the rate of turn of the craft at a value determined by the rate-of-turn determining signal.

12. In combination in an automatic control system for stabilizing a movable craft in a datum attitude about an axis, mounting means, a movable member mounted thereon so as to be displaceable under the action of a force which is a function of the rate of change in the attitude of the craft about an axis thereof, pick-off means operatively associated with said member and constructed to produce a signal indicating movement of said member from a datum position, an amplifier connected to receive signals from said pick-off means, a motor connected to be controlled by the output of said amplifier and operating to restore the craft to the desired datum attitude about said axis, a signal generator for generating a signal which is a function of the speed of said motor and a force producing means connected to said signal generator for producing a force on said movable member in opposition to the first mentioned force acting thereon whereby zero error within said system in cancelled and does not affect the attitude of the craft.

FREDERICK WILLIAM MEREDITH.
JAMES SUDWORTH.
DENNIS LELLO MEREDITH.
DAVID WILLIAM RIGHTON.

References Cited in the file of this patent

UNITED STATES PATENTS

| Number | Name | Date |
|---|---|---|
| 1,966,170 | Greene | July 10, 1934 |
| 2,115,086 | Riggs | Apr. 26, 1938 |
| 2,233,415 | Hull | Mar. 4, 1941 |
| 2,349,287 | Krussmann | May 23, 1944 |
| 2,382,993 | Haskins | Aug. 21, 1945 |
| 2,401,168 | Kronenberger | May 28, 1946 |
| 2,586,817 | Harris, Jr. | Feb. 26, 1952 |
| 2,591,938 | Holliday | Apr. 8, 1952 |
| 2,617,615 | Von Eschen | Nov. 11, 1952 |